June 26, 1956 W. G. EHRICH 2,752,420

COLOR TELEVISION RECEIVING SYSTEMS

Filed Oct. 9, 1953 2 Sheets-Sheet 1

INVENTOR.
WILLIAM G. EHRICH
BY
Deen V. Hazeltine
ATTORNEY

INVENTOR.
WILLIAM G. EHRICH
BY
Allen V. Hazeltine
ATTORNEY

United States Patent Office 2,752,420

Patented June 26, 1956

2,752,420

COLOR TELEVISION RECEIVING SYSTEMS

William G. Ehrich, Barrington, N. J., assignor to Philco Corporation, Philadelphia, Pa., a corporation of Pennsylvania Application October 9, 1953, Serial No. 385,075

5 Claims. (Cl. 178—5.4)

The present invention relates to electrical systems and more particularly to cathode ray tube systems for producing a color television image.

The invention is particularly adapted for, and will be described in connection with, a color television image producing system utilizing a single cathode ray tube having a beam intercepting, image forming screen comprising vertically arranged laterally displaced stripes of luminescent materials which respond to electron impingement to produce light of three different primary colors. From a color television receiver there may then be supplied three separate video signals, each indicative of a different color component of the televised scene, which signals are sequentially utilized to control the intensity of the cathode ray beam. For proper color rendition, it is required that upon impingement by the electron beam, the amounts of the light emitted by the different luminescent materials, and hence the visual efficiencies of the luminescent materials, be in the proper ratio to produce color balance in the image to be reproduced. Furthermore, it is required that, as the luminescent stripes producing each of the primary colors of light are impinged by the cathode ray beam, the intensity of the beam be simultaneously controlled in response to the contemporaneous value of the video signal representing the corresponding color component of the televised image.

In practice, the luminescent materials commonly used to produce light of the three different primary colors do not have visual efficiencies in the ratio required to produce color balance in the reproduced image. More particularly, when using a red light producing phosphor consisting of zinc phosphate containing manganese as an activator and a green light producing phosphor consisting of zinc orthosilicate which phosphors have so far proved to be the most efficient and the most practical to use for making up the cathode ray tube image screen, it is found that the visual efficiency of the red phosphor is approximately 50% of that required to match the green phosphor and thereby produce the desired color balance. Since several phosphor materials of different visual efficiencies are available for producing blue light, it has been the practice to use that particular blue phosphor which matches the red phosphor above mentioned to produce the desired color balance. Typically a blue light producing phosphor consisting of calcium magnesium silicate containing titanium as an activator has been used.

It has been proposed to compensate the deficiency of the available red phosphors by increasing the intensity of the red component of the video signal relative to the intensity of the green component. However, this expedient requires complex circuitry if proper color balance is to be maintained throughout the brightness range of the reproduced image. Alternatively, it has been proposed to decrease the efficiency of the green phosphor or to use a less efficient green phosphor so that, for the same beam current, the intensities of the light produced by the red, green and blue phosphors are in their proper ratio. While this expedient achieves the desired result without affecting the color balance of the reproduced image over the operating brightness range, it nevertheless reduces the overall conversion efficiency of the image screen and thereby reduces the overall brightness of the color image obtainable.

To achieve the desired synchronous relationship between the position of the beam and the contemporaneous value of the video signal it has been proposed to derive, from the image screen, indexing signals indicative of the instantaneous position of the cathode ray beam upon the image screen, and to utilize these indexing signals to control the relative phase of the signal applied to the beam intensity controlling system. These indexing signals may be derived from a plurality of beam responsive signal generating regions of the image screen, which regions are disposed in a geometric configuration indicative of the geometric configuration of the color producing stripes. In one form, these regions may be constituted by a plurality of indexing stripes arranged on the image screen so that, as the beam scans the screen, the indexing stripes are excited in spaced time sequence corresponding to the scanning of the consecutive groups of phosphor stripes and a series of pulses is generated in a suitable output electrode system of the cathode ray tube.

Such indexing stripes may comprise a material having a secondary-electron emissive properties which differ from the secondary electron emissive properties of the remaining portions of the image screen. For example, the indexing stripes may consist of a high atomic number material such as gold, platinum or tungsten, or may consist of certain oxides such as cesium oxide or magnesium oxide. Alternatively, the indexing stripes may consist of a fluorescent material, and the indexing signals may be derived from a suitable photoelectric cell arranged at the side wall portion of the cathode ray tube and facing the beam intercepting surface of the screen structure. Such a phosphor material may consist, for example, of cesium activated zinc oxide having a spectral output in the non-visible light region, or may consist of a phosphor having its spectral output in the visible light region, in which case suitable light baffling means may be interposed between the fluorescent image producing stripes and the indexing stripes to prevent mutual contamination of the respective responses.

The intensity of the indexing signal produced at the output electrode system of the cathode ray tube is determined by the response of the indexing stripes to the impinging electrons of the cathode ray beam and by the intensity of the beam. Since the beam undergoes changes in intensity corresponding to variations in the intelligence representative of the image to be reproduced, the amplitude of the indexing signal generated similarly undergoes changes in amplitude. These amplitude variations of the indexing signal may be made ineffective by means of a suitable amplitude limiter contained in the circuits for processing the indexing signal. However, it is found that the variations of the intensity of the beam as it scans the phosphor stripes also brings about phase variations of the generated indexing signal. These phase variations, which cannot readily be compensated by the signal processing circuits, may be sufficient in magnitude to seriously impair the color rendition of the reproduced image.

It is an object of the invention to provide an improved cathode ray tube system for producing a color television image.

A further object of the invention is to provide an improved color television image reproducing system in which the effective efficiency of the red-light-producing phosphor is considerably enhanced in a simple and effective manner, thereby simplifying the construction of the image reproducing system and improving the brightness of the reproduced image.

Another object of the invention is to provide improved cathode ray tube systems of the type in which the position of an electron beam on a beam intercepting screen structure is indicated by an indexing signal derived from an indexing member cooperatively associated with the screen structure.

Still another object of the invention is to provide a color television cathode ray tube system of the foregoing type in which undesired phase variations of the indexing signal, normally produced upon changes in the color content of the image, are obviated.

A specific object of the invention is to provide a novel color television image reproducing system comprising an image screen embodying a novel cooperative relationship between the disposition of the phosphor stripes and the disposition of the indexing regions thereof, whereby simultaneously the effective efficiency of the red-light-producing stripes is enhanced and undesired phase variations of the indexing signal, normally produced upon changes of the color content of the reproduced image, are obviated.

These and further objects of the invention will appear as the specification progresses.

In accordance with the invention, in a cathode ray tube system adapted to produce a color television image by means of a cathode ray tube having an image screen comprising consecutive groups of phosphor stripes which are energized by a transversely scanning electron beam and further comprising indexing regions in the form of stripes extending parallel to the phosphor stripes, the foregoing objects are achieved by positioning the red-light-producing phosphor stripes symmetrically with respect to the green and blue-light-producing phosphor stripes and symmetrically with respect to the indexing stripes. More specifically, and in accordance with the invention, the foregoing objects are achieved by positioning the phosphor stripes on the image screen in the pattern red, green, red, blue, red, green etc., and by positioning the indexing stripes substantially midway between adjacent pairs of red stripes, i. e. on consecutive blue stripes or on consecutive green stripes. By so positioning the red stripes, the number, and hence the effective area, thereof is doubled relative to the number of the green or blue phosphor stripes, thereby compensating the low efficiency of the red-light-producing phosphor and, at the same time, obviating phase errors normally due to changes in the color content of the reproduced image.

The invention will be described in greater detail with reference to the appended drawings forming part of the specification and in which.

Figures 1, 2:
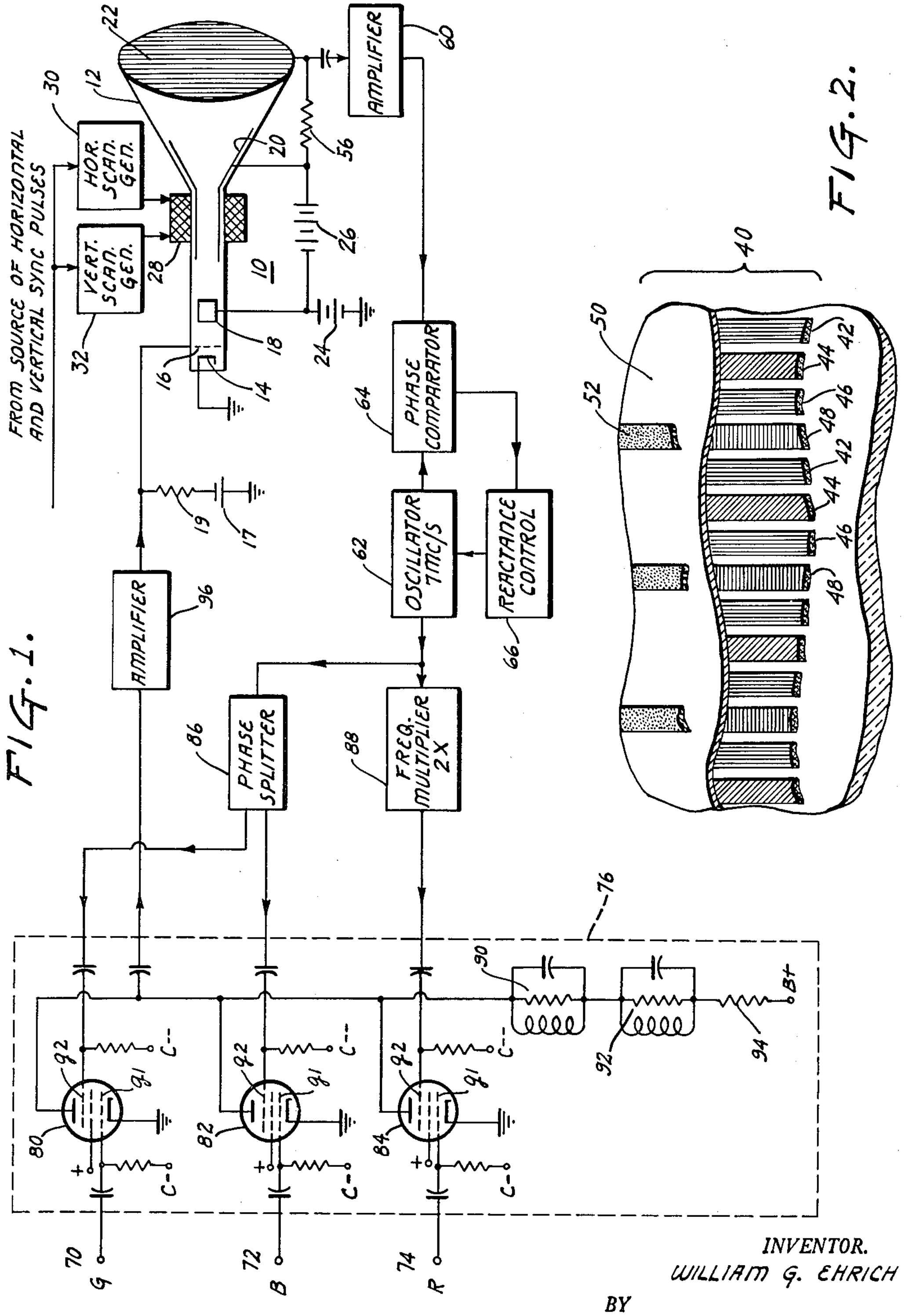
Figure 1 is a block diagram, partly schematic, illustrating one form of a cathode ray tube system in accordance with the invention.
Figure 2 is a perspective view of a portion of one form of an image reproducing screen suitable for the cathode ray tube system of the invention.

Referring to Figure 1, the cathode ray tube system there shown comprises a cathode ray tube 10 containing, within an evacuated envelope 12, a beam generating and intensity control system comprising a cathode 14, a control electrode 16, a focusing electrode 18 and an accelerating electrode 20, the latter of which may consist of an electrically conductive coating on the inner wall of the envelope and which terminates at a point spaced from the end face 22 of the tube 10 in conformity with well established practice. Electrode 16 may be maintained at a desired bias potential by means of a battery 17 having its negative pole connected to the electrode through a resistor 19. Suitable voltage sources, shown as the batteries 24 and 26, maintain the electrodes 18 and 20 at their desired operating potentials, the battery 24 having its negative terminal connected to a point at ground potential and its positive terminal connected to eletcrode 18, and the battery 26 being connected with its negative terminal to the positive terminal of battery 24 and with its positive terminal to the electrode 20.

A deflection yoke 28, coupled to horizontal and vertical scanning generators 30 and 32, respectively, of conventional design, is provided for deflecting the electron beam across the face plate 22 to form a raster thereon.

The face plate 22 of the tube 10 is provided with an image forming screen, one suitable form of which is shown as 40 in Figure 2. The structure 40 comprises a plurality of parallelly arranged phosphor stripes of luminescent material which, upon electron impingement, produce light of the three different primary colors red, green and blue. In accordance with the invention, the red phosphor stripes, of less visual efficiency, are arranged symmetrically wtih respect to the blue and green phosphor stripes so that the number thereof is equal to twice the number of the green or blue stripes. This construction is shown in Figure 2 from which it will appear that the red phosphor stripes shown as 42 and 46 are interposed between the green phosphor stripes 44 and blue phosphor stripes 48 so that the red stripes are symmetrically positioned with respect to the green and blue stripes and the repetitive sequence of the stripes is in the pattern R, G, R, B, R, G, R, B, etc. At the present state of the art, a red phosphor consisting of zinc phosphate containing manganese as an activator, and a green phosphor consisting of zinc orthosilicate have proved to be the most efficient and expedient to use for making up the stripes 42, 44 and 46. The particular red phosphor has a visual efficiency of the order of one half of that required to match the efficiency of the green phosphor to produce the required color balance in the image to be reproduced. Accordingly, by constructing the stripes 42, 44 and 46 with the same width as shown in Figure 2 so that the overall area of the red phosphor stripes is substantially equal to twice the area of the green stripes, the effective efficiency of the red stripes is increased to the required amount. In view of the enhanced efficiency of the red stripes, a phosphor which is more efficient than the calcium magnesium silicate previously mentioned, may be used for the blue stripes 48, for example a blue phosphor consisting of zinc calcium sulphide containing silver as an activator. Other phosphor materials which may be used to form the stripes 42, 44, 46 and 48 are well known to those skilled in the art, as well as methods of applying the same to the face plate 22, and further details herein concerning the same are believed to be unnecessary. However, since the red phosphor above mentioned has so far in practice proved to be the most efficient generally available, the use of other and lower efficiency phosphors can be expected to bring about a lower image brightness. When a red phosphor, having an efficiency relative to the green phosphor less than that of the red phosphor above specified, is used, it may be necessary to additionally dilute, at least to some extent, the green and/or the blue phosphors in order to achieve the required color balance. However, it will be apparent that, when the stripe arrangement as shown in Figure 2 is used, the amount by which the green and/or blue phosphors are diluted may be held to a minimum so that the brightness of the image will be adversely affected to only a minor extent.

The image screen 40 further serves for producing an indexing signal indicative of the position of the cathode ray beam on the image screen. In the arrangement shown, the indexing signal is produced by utilizing stripes of a material having a secondary-electron emissivity detectably different from the secondary-electron emissivity of the remainder of the image screen. For this purpose the screen 40 further comprises a thin, electron permeable conducting layer 50 of low secondary-electron emissivity and stripes 52 of a material having a relatively high secondary-electron emissivity. The layer 50 is arranged on the phosphor stripes and preferably further constitutes a mirror for reflecting light generated at the phosphor stripes. In practice the layer 50 is a light reflecting aluminum coating which is formed in well known manner. Other metals capable of forming a coating in the manner similar to aluminum, and having a secondary-electron emissivity detectably different from that of the material of the indexing stripes 52, may also be used. Such other metals may be, for example, magnesium or berryllium.

The indexing stripes 52 may consist of magnesium oxide, or may consist of a high atomic number metal such as gold, platinum or tungsten.

As will be noted, the indexing stripes 52 are positioned over the blue phosphor stripes 48 so that the red stripes 42 and 46 are arranged symmetrically about the indexing stripes. Alternatively the indexing stripes could be positioned over the green phosphor stripes 44 whereby, here again, the red stripes 42 and 46 become arranged symmetrically about the indexing stripes.

This double symmetry of the red stripes about the blue and green phosphor stripes and about the indexing stripes, in accordance with the invention, leads not only to improved image brightness, because the effective efficiency of the red stripes is enhanced, but also obviates phase shifts of the indexing information upon changes in the color content of the image as is explained more fully hereinafter.

The beam intercepting structure 40 so constituted is connected to the positive pole of the battery 26 through a load impedance 56 (see Figure 1) by means of a suitable connection to the conductive coating 50 thereof.

The scanning of the cathode ray beam over the surface of the image screen causes the beam to impinge successively the consecutive indexing stripes 52 and thereby produce across the load impedance 56 a succession of indexing signal pulses, the time phase position of which is indicative of the position of the beam on the screen surface. In a typical case, in which the beam impinges consecutive indexing stripes at a rate of 7 million per second as determined by the number of indexing stripes and by the nominal scanning velocity of the beam, the frequency of the consecutive pulses generated will be nominally 7 mc./sec. and will undergo frequency variations about the nominal value as determined by variations of the rate at which the consecutive indexing stripes are impinged. This indexing signal, after being suitably amplified by an amplifier 60, may be used in any of several manners for controlling the relationship between the time phase position of the video information supplied to the beam intensity control electrode 16 and the position of the beam. In the arrangement shown in Figure 1, the indexing signal serves to control the phase and frequency of the signal produced by an oscillator 62, which latter signal, in turn, is used for controlling the time sequence in which three separate video signals, each indicative of a different primary color component of the televised scene, are applied to the control electrode 16. The control of the oscillator 62 is brought about by means of a control system comprising a phase comparator 64, to the inputs of which the indexing signal from amplifier 60 and a signal from oscillator 62 are applied, and a reactance control 66 which is energized by the phase comparator 64 and which is adapted to vary the frequency and phase of the signal produced by oscillator 62.

Amplifier 60 may be of conventional form and is characterized by having sufficient gain to amplify the indexing signal derived from the image screen of tube 10 to a conveniently usable level, and may be adapted to do so without distortion of the indexing signal wave form, although this is not essential so long as the phase characteristics of the amplifier are such that the peaks of the amplified output signals therefrom occur in predetermined time relationship to the times of the peaks of the input signal from the load impedance 56. The amplifier may further contain an amplitude limiter of conventional design, i. e. a diode clipper, by means of which a substantially constant amplitude output signal is produced.

In a typical form the oscillator 62 may comprise an electron discharge device having its input and output electrodes coupled together in regenerative feedback relationship by means of a resonant circuit tuned to the nominal frequency of the oscillator, i. e. tuned to 7 mc./sec.

The phase comparator 64 may be conventional in form and may consist for example of a bridge, two arms of which are made up of diode elements which are energized in phase opposition by one of the input signals and energized in the same phase sense by the other of the input signals. In one form the phase comparator may be of the type described by R. H. Dishington in the publication "Proceedings of the I. R. E." December 1949, at page 1401 et seq. The output signal of the phase comparator 64 will have a polarity and amplitude as determined by the instantaneous difference between the frequency of the oscillator 62 and the output signal of amplifier 60, and this output signal serves as a control quantity actuating the reactance tube 66 which in turn adjusts the frequency of oscillator 62 to exact synchronism with the indexing signal derived from amplifier 60.

The reactance control 66 may take any of well known forms and may consist, for example, of a Miller type reactance tube shunting the tuned circuit of oscillator 62 and adapted to vary the resonant frequency thereof as determined by the amplitude of the control signal which is applied to the input electrode of the reactance tube and is derived from the phase comparator 64.

For the reproduction of a color image on the image screen of the cathode ray tube there are provided color signal input terminals 70, 72 and 74 which are supplied from a television receiver (not shown) with separate signals indicative of the green, blue and red components of the televised scene, respectively. The system then operates to convert these three color signals into a wave having the color information arranged in time sequence so that the green information occurs when the beam impinges the green stripes 44, the blue information occurs when the beam impinges the blue stripes 48 and the red information occurs when the beam impinges the red stripes 42 and 46. For the specific stripe arrangement herein considered, the color information is supplied to the control electrode 16 in the sequence R, G, R, B, R, G etc. For this purpose there is provided a modulator system 76 comprising three multigrid thermionic tubes 80, 82 and 84. The green input signal from terminal 70 is supplied to the control grid $g_1$ of the tube 80, the blue input signal from terminal 72 is supplied to the control grid $g_1$ of tube 82, and the red input signal from terminal 74 is supplied to the control grid $g_1$ of tube 84. The grids $g_1$ are supplied in conventional manner with a negative bias voltage C— which, during normal conduction of the tubes, imparts a linear operating characteristic thereto.

The tubes 80, 82 and 84 are maintained normally non-conductive by means of a negative bias voltage C— applied to the control grids $g_2$ thereof, and are rendered selectively conductive by appropriate signals supplied to the grids $g_2$ from the oscillator 62. More particularly, the grids $g_2$ of tubes 80 and 82 are supplied with 7 mc./sec. switching signals of opposite phase polarity derived from the oscillator 62 through a phase splitter, and the grid $g_2$ of tube 84 is supplied with a 14 mc./sec. switching signal derived from the oscillator 62 through a frequency multiplier 88.

The phase splitter 86 may be conventional in form and may consist of a triode tube having its input grid connected to the oscillator 62 and having load impedances of equal value in its anode and cathode circuits, whereby the desired two signals of opposite phase polarity are generated at the anode and cathode electrodes thereof.

The frequency multiplier 88 may be conventional in form, and may consist of two triodes having their grids energized in phase opposition by the oscillator 62 and having their anodes connected in common to a resonant circuit broadly tuned to 14 mc./sec.

The amplitude of the switching signals applied to the control grids $g_2$ are appropriately adjusted relative to the cut-off bias C— also applied to these tubes so that tubes 80 and 82 alternately conduct for a 90° interval during each cycle of the voltage produced by oscillator 62 and the tube 84 conducts during two 90° intervals during each cycle of the oscillator voltage, the 90° conduction intervals of the tube 84 occurring between the 90° conduction intervals of the tubes 80 and 82.

The anodes of the tubes 80, 82 and 84 are connected in common to an anode supply B+ by means of a composite load impedance comprising a damped resonant circuit 90 broadly tuned to 14 mc./sec., a damped resonant circuit 92 broadly tuned to 7 mc./sec., and a low frequency impedance 96 which may consist of a resistor as shown. The output of the modulator system 76 is supplied to the intensity control electrode 16 through an amplifier 96. Amplifier 96 may be conventional in form and may include a sufficient number of stages so that the output signal of the modulator 76 is amplified to the desired level and has the proper phase polarity.

The system operates to apply to the control electrode 16 the three color component signals at input terminals 70, 72 and 74 in a sequence and for a duration conforming to the geometry of the green, blue and red phosphor stripes of the image screen and at time instants as established by the position of the beam as indicated by the phase of the signal generated by the controlled oscillator 62. More particularly, during the time that the beam impinges the green stripe 46, tube 80 is made conductive by the positive going excursion of the 7 mc./sec. signal applied to the grid $g_2$ thereof from the phase splitter 86. Following the conduction period of tube 80, tube 84 is then made conductive by the positive going excursion of the 14 mc./sec. switching signal derived from the frequency multiplier 88, during which time the beam impinges the red phosphor stripe 46. At the instant the beam impinges the blue stripe 48 the tube 82 is in turn made selectively conductive by the positive going excursion of the 7 mc./sec. signal applied to the grid $g_2$ thereof from the phase splitter 86. The scanning of the blue stripe 48 is then followed by the scanning of the adjacent red stripe 42, during which time tube 84 is again made conductive by the positive going excursion of the 14 mc./sec. switching signal applied to the grid $g_2$ thereof from the frequency multiplier 88. This sequence of operation of the tubes is repeated throughout the scanning period.

In the specific examples given above, it has been assumed that the green and blue phosphors have visual efficiencies in the ratio required to produce color balance and that the red phosphor has an efficiency equal to one-half that required to produce color balance. In practice this condition is usually closely approximated so that the conduction angles of the tubes 80, 82 and 84 will be approximately equal to 90° as stated above. It will be appreciated that, when phosphors are selected in which this relationship of efficiencies is not satisfied, it may be desirable to dilute the green and/or the blue phosphor to approximate this relationship. Alternatively the width of the green and/or blue phosphor stripes may be modified to compensate the difference in efficiency of these phosphors, in which case the conduction periods of the tubes 80 and 82 should be correspondingly modified—i. e., in the case that the blue phosphor is more efficient than required to achieve color balance, the width of the blue phosphor stripe may be reduced and the conduction period of the tube 82 correspondingly reduced.

It has been shown above how the symmetrical positioning of the red stripes with respect to the blue and green phosphor stripes provides a simple and effective method for compensating the low inherent efficiency characterizing the red phosphors to the use of which the color television art is now restricted. It will now be shown how the symmetrical positioning of the red stripes 42 and 46 with respect to the indexing stripe 52 brings about an indexing signal free from phase variations normally brought about by changes of the color content of the reproduced image.

Figure 3:
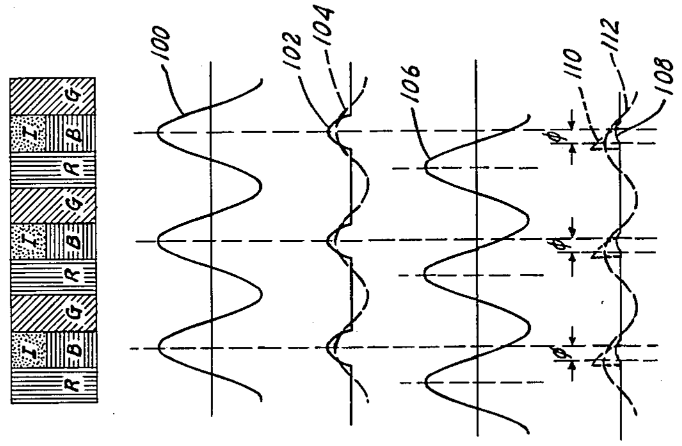
Figure 3 is a graphical representation illustrating the manner in which phase errors are brought about in the indexing systems of prior art cathode ray tube systems.

In order to simplify the explanation of how the invention system obviates phase errors of the indexing signal normally brought about by changes of the color content of the reproduced image, reference is made to Figure 3 which graphically illustrates the manner in which these phase variations of the indexing signal are brought about in cathode ray tube systems of the prior art.

In Figure 3 a typical prior art image screen has been represented, said image screen being constructed of consecutively arranged groups of red, green and blue phosphor stripes, R, G and B, arranged in repetitive order across the image screen. Typically the indexing stripe I is superimposed on one of the phosphor stripes, i. e. on the blue phosphor stripe B, so that the indexing stripe is preceded by a red phosphor stripe and is followed by a green phosphor stripe. It will be apparent from the following explanation that the positioning of the indexing stripe over the blue phosphor stripe is not critical and that undesirable phase variations will also occur when the indexing stripe I is positioned on one of the other phosphor stripes.

To a first order approximation, the intensity variations of the cathode ray beam energizing an image screen, constructed as above described, will be sinusoidal in form. (Actually, the sinusoidal variations occur about the value of a reference level signal component establishing the brightness of the image. However, this reference level component need not be considered for the purposes of this explanation.) When a saturated blue picture element is to be reproduced, the beam intensity variations have a phase such that the positive peaks thereof occur at the time that the beam impinges the center of the blue stripes—i. e., as shown by the wave form 100 representing the beam intensity variations during the reproduction of a blue image field or of a large blue area made up of several consecutive blue picture elements. Under this condition, the beam attains its maximum intensity value coincident with its impingement of the center of the indexing stripes I superimposed on the blue phosphor stripes B, and indexing pulses as shown by the waveform 102 are produced by the indexing system of the tube. These indexing pulses attain their peak value coincident with the impingement of the center of the indexing stripes so that a sinusoidal indexing signal (shown by the dotted wave form 104), properly related in phase to the position of the indexing stripes, may be derived from the tube system.

While this signal may incidentally exhibit amplitude variations as determined by the brightness variations of the blue picture area being reproduced, these intensity variations are of only minor consequence and may be readily removed by an appropriate amplitude limiter embodied within the indexing signal processing circuit.

Assume now that a red image field is to be reproduced. In this case the beam intensity exhibits its peak value when the beam impinges the red phosphor stripes, as shown by the wave form 106, and should be imperceptibly small while impinging the blue phosphor stripes. (To permit excitation of the indexing stripes I, the beam current is not reduced to zero during the impingement of the blue phosphor stripes.) Ideally, under these conditions, only the indexing pulses shown at 108 should be produced by the indexing system of the tube. However, the beam spot has finite dimensions, which, as a practical matter, are of the same order of magnitude as the width of the phosphor stripes so that the beam energizes the adjacent edge of the indexing stripe during the time that it is energizing the red phosphor stripe. This energization of the indexing stripe while the axis of the beam is still traversing the red phosphor stripe brings about spurious indexing pulses, shown at 110, in the indexing system of the tube. These spurious pulses 110 are large in magnitude compared with the pulses 108 because of the high intensity of the beam while scanning the red phosphor stripes, and have an effective axis displaced by an amount $\phi$ from the central axis of the pulses 108. The two indexing pulses 108 and 110 so produced in the indexing system of the cathode ray tube cannot readily be separated so that the output indexing signal shown at 112, which is derived from the combined pulses, is phase displaced from the center-line of the index stripe toward the red stripe by an amount determined by the intensity of the red field being reproduced.

Similar effects occur when reproducing a green image field, in which case the output indexing signal is phase shifted from the center line of the indexing stripe toward the green stripe, the amount of the shift being greater the brighter of the green field being reproduced.

Figure 4:
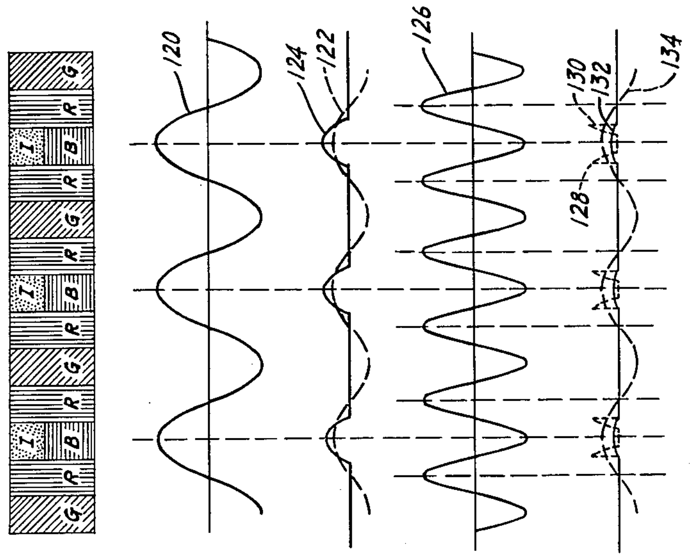
Figure 4 is a graphical representation illustrating the manner in which phase errors are obviated in the cathode ray tube systems in accordance with the invention.

Referring now to Figure 4 which graphically illustrates the manner in which the system of the invention obviates phase variations of the indexing information, it will be noted that the red phosphor stripes are symmetrically positioned with respect to the blue and green phosphor stripes and with respect to the indexing stripes. When a blue image field is being reproduced by a cathode ray beam exhibiting its peak intensity value when impinging the blue phosphor stripes, as shown by the wave form 120, the desired indexing information, in the form of a sine wave 122 in proper phase, may be derived from the pulses 124 generated by the beam impinging on the indexing stripes superimposed on the blue phosphor stripes in the manner previously described in connection with Figure 3.

When a red image field is to be reproduced, the intensity of the cathode ray beam exhibits its maximum value when impinging the red stripes as shown by wave form 126. Since the number of red phosphor stripes provided on the screen surface is twice the number of green or blue stripes, the intensity variations of the beam occur at twice the frequency of the beam intensity variations when reproducing a green or blue image field.

As previously noted, the beam has a finite spot size of the order of magnitude of the width of the phosphor stripes. Accordingly, during the time that the central axis of the beam is traversing the red phosphor stripes, the beam will also excite the adjacent portions of the indexing stripes and thereby produce pulse signals in the indexing system of the cathode ray tube. It will be noted, however, that since red phosphor stripes are positioned symmetrically about the indexing stripes, the beam energizes both the leading edge and the trailing edge of the indexing stripe and this causes two pulses 128 and 130 to be generated in the indexing system of the tube along with the indexing pulse 132 normally expected by the scanning of the indexing stripe. Since the pulses 128 and 130 are symmetrically positioned with respect to the central axis of the indexing stripe, their phase displacements relative to the central axis of the indexing stripe are effectively cancelled, so that the indexing signal shown as 134, derived from the indexing system of the tube, will be in phase coincidence with the central axis of the indexing stripe.

While I have described my invention by means of specific examples and in a specific embodiment, I do not wish to be limited thereto for obvious modifications will occur to those skilled in the art without departing from the spirit and scope of the invention.

What I claim is:

1. A cathode ray tube system for reproducing a color television image, comprising a cathode ray tube having a source of an electron beam, a control electrode for varying the intensity of the beam and a beam intercepting image screen, said image screen comprising a plurality of stripes of three different materials each producing light of a different color upon electron impingement, one of said materials having a visual efficiency substantially less than required to produce color balance in the reproduced image as determined by the visual efficiency of another of said materials, said stripes being arranged in a repetitive pattern wherein the stripes of said material of less efficiency are symmetrically positioned with respect to the stripes of each of said other materials and the number of said stripes of less efficient material is substantially equal to twice the number of stripes of each of said other materials, said screen further comprising stripe regions of a material adapted to produce upon electron impingement a response detectably different from the response of said light producing stripes, said stripe regions being arranged in register with the stripes of one of said other materials whereby said stripes of less efficiency are symmetrically positioned with respect to said indexing regions, means for periodically deflecting said beam across said image screen thereby to energize said light producing stripes and said stripe regions, means for applying to said beam intensity control means an image signal indicative at consecutive intervals of desired energization of said light producing stripes, said intervals recurring in a pattern corresponding to the pattern of said light producing stripes, means for deriving from said image screen a control signal having amplitude variations recurring in synchronism with the scanning of said beam over said stripe regions, and means responsive to said control signal for controlling the relationship between the time phase position of said image signal and the position of said beam on said image screen.

2. A cathode ray tube system as claimed in claim 1 wherein said light producing stripes have substantially the same width dimension.

3. A cathode ray tube system as claimed in claim 1 wherein said means for producing said image signal comprises a modulation system, said system comprising three electron discharge devices having individual input circuits and a common output circuit, means for applying to each of said input circuits individual video signals each indicative of a given color component of the image to be reproduced, means for coupling said output circuit to said beam intensity control means, means responsive to said control signal for actuating one of said modulators at a rate equal to the rate of impinging successive stripes of said material of less efficiency, and means responsive to said control signal for actuating said other electron discharge devices at rates equal to the rates of impinging the successive stripes of said other materials.

4. A cathode ray tube system as claimed in claim 1 wherein said light producing material of less efficiency is a red light producing phosphor material and said other light producing materials are green and blue light producing phosphor materials.

5. A cathode ray tube system as claimed in claim 4 wherein said red light producing phosphor consists essentially of zinc phosphate containing manganese as an activator, and wherein said green light producing phosphor consists essentially of zinc orthosilicate, and wherein said blue light producing phosphor consists essentially of zinc calcium sulfide containing silver as an activator.

References Cited in the file of this patent

UNITED STATES PATENTS

| | | |
|---|---|---|
| 2,446,791 | Schroeder | Aug. 10, 1948 |
| 2,667,534 | Creamer | Jan. 26, 1954 |
| 2,674,651 | Creamer | Apr. 6, 1954 |